J. N. HAZELIP.
Improvement in Square-Topped or Jagger-Wagons.
No. 132,531. Patented Oct. 29, 1872.

Witnesses:

Inventor:

UNITED STATES PATENT OFFICE.

JOSEPH N. HAZELIP, OF BALTIMORE, MARYLAND.

IMPROVEMENT IN SQUARE-TOPPED OR "JAGGER" WAGONS.

Specification forming part of Letters Patent No. 132,531, dated October 29, 1872.

*To all whom it may concern:*

Be it known that I, JOSEPH N. HAZELIP, of the city of Baltimore and State of Maryland, have invented certain new and useful Improvements in the Tops of Carriages; and I do hereby declare that the following is a full, clear, and exact description thereof that will enable others skilled in the art to which it appertains to make and use the same, reference being had to the accompanying drawing and to the letters of reference marked thereon which form a part of this specification.

My invention has for its object the furnishing of a cheap, simple, and reliable means by which jagger-wagons and other like vertical-standard top vehicles may have their tops lowered or raised more readily than the well-known calash top now in common use. The ordinary jagger-wagon is generally constructed with either two, three, or four vertical rigid standards for supporting the top. Other square-topped vehicles are constructed with any number of standards that may be desired, and my invention is such as to be readily applicable to the tops of all vehicles of the above class; and my invention consists in constructing the standards or posts that support the tops of jagger-wagons and other like vehicles with hinges or joints, so that the standards and top may be dropped or lowered to a horizontal position, parallel to the bed, body, or seat of the vehicle, or to any angle or elevation that may be desired. By said arrangement of hinges or joints I am further enabled to drop the top itself to a vertical position directly at the back of the body of the vehicle, where it rests securely and out of the way, presenting a neat and finished appearance. When vehicle standards and top are arranged with hinges or joints after the manner of my invention, said standards and top can be readily lowered or raised, either from within or from without the vehicle. The standards and top, when raised, are held rigidly to their proper place by the addition of what are commonly known as side joints, operating in connection with the body of the vehicle and its jointed standards.

Figure 1:
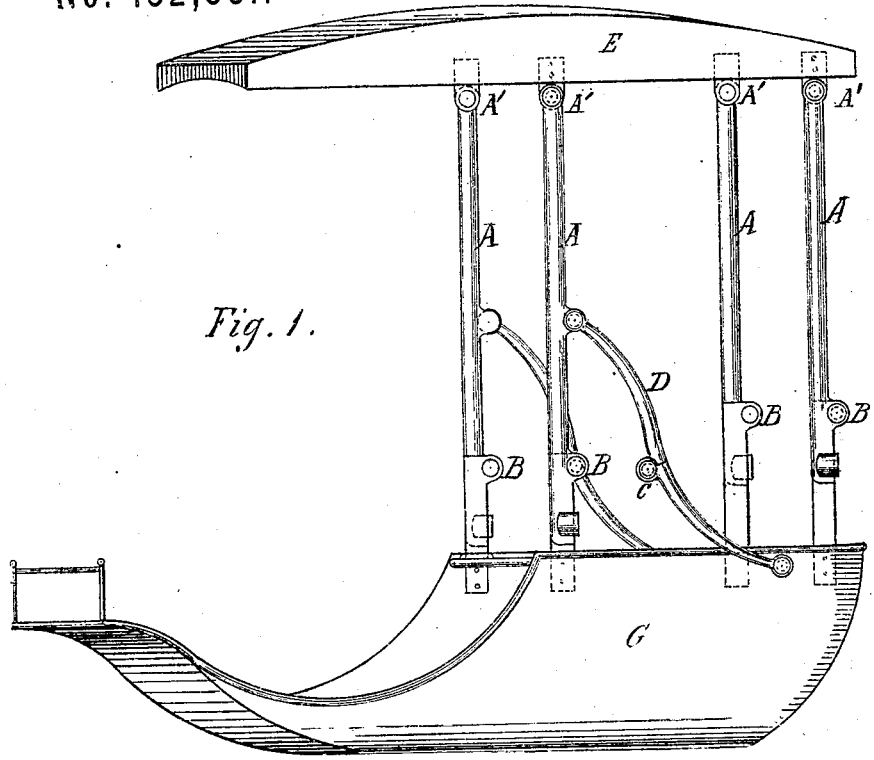

In the accompanying drawing, Figure 1 is a jagger-wagon body and top, with the top standing in the usual position; but it may be noticed that the standards A supporting the top are provided with hinges or joints B B B B, near the seat or body of the wagon, and are also hinged or jointed at A' A' A' A' to the top E of the wagon. The hinges or joints A' A' A' A', with two hinges, B B, on the back standards, not only assist in allowing the standards and top being lowered or dropped to a position, as indicated by the dotted lines in Fig. 2, but they also admit of a further and equally important function—that of allowing the wagon-top E, with the two back standards, being shoved or dropped to a vertical or almost vertical position at the back of the wagon, as shown in the same figure.

D, Fig. 1, is what is usually denominated a side joint. It will be observed that there are two of these joints, one, attached by their ends, to each of the front standards, and having their opposite ends secured to the body or seat of the wagon. These side joints, when thrown open or extended, as in Fig. 1, are for the purpose of holding the standards and top, when up, rigidly in position. This they accomplish so effectually that the standards and top are as rigid and secure as if they were not hinged.

Figure 2:
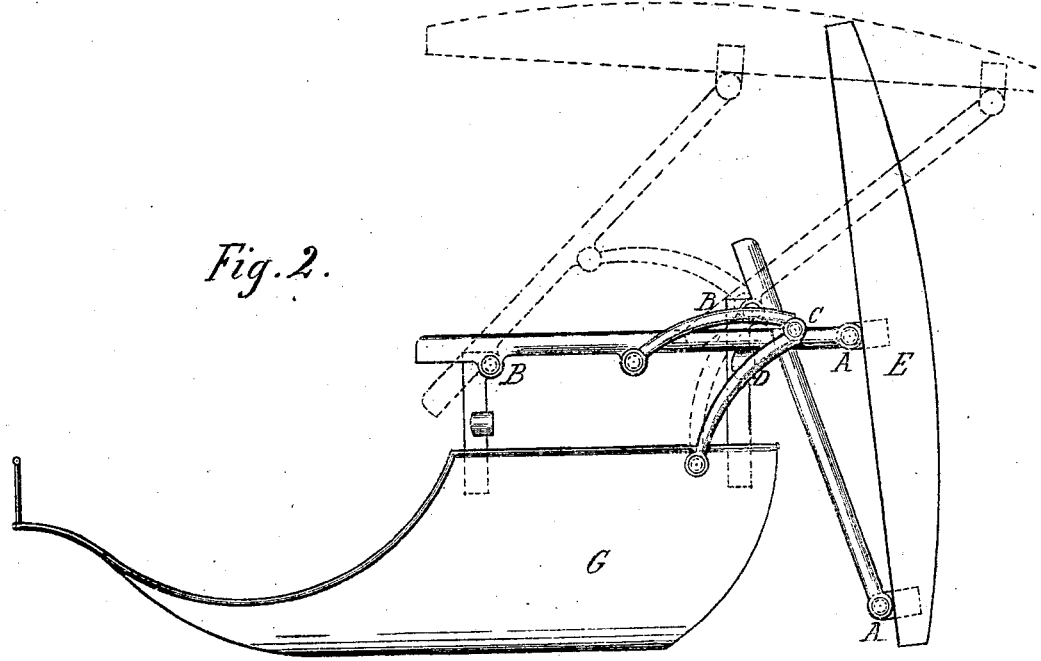

The manner of lowering the standards and top is by simply releasing or closing the said side joints, when the standards and top are readily dropped to the position as shown in Fig. 2.

I do not confine myself to the use of two side joints. One, two, or more may be used if desirable, and their location may be varied to suit any vertical standard, or square-top vehicle.

The hinges B B B B are of special construction, as shown in the drawing, and this form seems most desirable, giving great strength to the standards; yet any of the well-known forms of knee or rule-joint hinges will answer the purpose, and even, perhaps, be preferred, in point of taste.

Having described my invention, what I claim and desire to secure by Letters Patent, is—

1. In square-topped or jagger wagons, the standards A, hinged at A' and jointed at B, substantially as described, and for the purpose herein set forth.

2. The combination, with standards A, jointed and hinged, as described, of the side joint D, as described, for the purpose set forth.

J. N. HAZELIP.

Witnesses:
 C. H. SLICER,
 O. S. HAZELIP.